(12) United States Patent
De Vaulx et al.

(10) Patent No.: US 9,176,755 B2
(45) Date of Patent: Nov. 3, 2015

(54) METHOD AND DEVICE FOR SIMULATING A SOFTWARE APPLICATION TO EXECUTE IN A SYSTEM

(75) Inventors: Sébastien De Vaulx, Toulouse (FR); Clément Magnin, Blagnac (FR); Pierre Damien Thabault, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 404 days.

(21) Appl. No.: 13/117,672

(22) Filed: May 27, 2011

(65) Prior Publication Data

US 2011/0295588 A1     Dec. 1, 2011

(30) Foreign Application Priority Data

May 27, 2010   (FR) ...................................... 10 54060

(51) Int. Cl.
| | |
|---|---|
| G06F 9/44 | (2006.01) |
| G06F 9/455 | (2006.01) |
| H04L 12/24 | (2006.01) |
| G06F 11/36 | (2006.01) |
| H04L 12/26 | (2006.01) |
| G06F 11/07 | (2006.01) |

(52) U.S. Cl.
CPC ............ G06F 9/455 (2013.01); G06F 11/3696 (2013.01); *G06F 11/0739* (2013.01); *G06F 11/0766* (2013.01); *G06F 11/3664* (2013.01); *H04L 41/06* (2013.01); *H04L 43/065* (2013.01); *H04L 43/16* (2013.01)

(58) Field of Classification Search
CPC ............... G06F 11/3696; G06F 9/455
USPC ......................................................... 714/38.1
See application file for complete search history.

(56) References Cited

U.S. PATENT DOCUMENTS

| | | | | |
|---|---|---|---|---|
| 3,557,315 | A | * | 1/1971 | Stanislas Kobus et al. ... 379/111 |
| 3,568,157 | A | * | 3/1971 | Downing et al. ............. 710/264 |
| 4,444,048 | A | * | 4/1984 | Nitschke et al. ........... 73/114.61 |
| 4,486,829 | A | * | 12/1984 | Mori et al. ....................... 714/34 |
| 4,584,684 | A | * | 4/1986 | Nagasawa et al. ............ 714/749 |
| 5,341,497 | A | * | 8/1994 | Younger .......................... 714/51 |
| 5,504,856 | A | * | 4/1996 | Sasaoka ............................. 714/3 |
| 5,715,161 | A | * | 2/1998 | Seo ................................ 701/33.4 |
| 6,259,981 | B1 | * | 7/2001 | Wilcosky ..................... 701/33.9 |
| 6,269,478 | B1 | * | 7/2001 | Lautenbach-Lampe et al. ............................. 717/127 |
| 6,557,120 | B1 | * | 4/2003 | Nicholson et al. ......... 714/38.13 |
| 6,665,824 | B1 | * | 12/2003 | Ruhlen et al. ................... 714/57 |
| 6,704,896 | B1 | * | 3/2004 | Maeda ........................... 714/733 |

(Continued)

OTHER PUBLICATIONS

French Preliminary Search Report issued Sep. 15, 2010, in French 1054060, filed May 27, 2010.

(Continued)

*Primary Examiner* — Akash Saxena
(74) *Attorney, Agent, or Firm* — Oblon, McClelland, Maier & Neustadt, L.L.P.

(57) ABSTRACT

A method for simulation of a software program able to be run in a system and to control at least one action on expiration of a counter of the system, includes:
the implementation of steps as a result of running instructions of the software program (L), and
the implementation of a step (L') separate from the steps implemented as a result of running the software and resulting in an early running of the said action.
An associated device also is proposed.

16 Claims, 2 Drawing Sheets

(56) References Cited

U.S. PATENT DOCUMENTS

| | | | |
|---|---|---|---|
| 6,718,513 B1* | 4/2004 | Ryu | 714/799 |
| 7,069,543 B2* | 6/2006 | Boucher | 717/127 |
| 7,757,122 B2* | 7/2010 | Hikita et al. | 714/27 |
| 8,010,325 B2* | 8/2011 | De Barros et al. | 703/2 |
| 8,375,258 B1* | 2/2013 | Sheets et al. | 714/55 |
| 2002/0133322 A1* | 9/2002 | Williams | 703/8 |
| 2003/0101041 A1* | 5/2003 | Gabele et al. | 703/22 |
| 2003/0212989 A1* | 11/2003 | Rokosz | 717/135 |
| 2010/0114892 A1* | 5/2010 | Kaneko et al. | 707/737 |
| 2013/0097461 A1* | 4/2013 | Chabot et al. | 714/38.1 |

OTHER PUBLICATIONS

Teemu Kanstren, "A Study on Design for Testability in Component-Based Embedded Software", Sixth International Conference on Software Engineering Research, Management and Applications, XP031313914, Aug. 2008, pp. 31-38.

Lee S. Carmichael, et al., "Characterization and Comparison of Modern Layer-2 Ethernet Survivability Protocols", System Theory, 2005. SSST '05. Proceedings of the Thirty-Seventh South Eastern Symposium on Tuskegee, XP010813115, Mar. 2005, pp. 124-129.

* cited by examiner

METHOD AND DEVICE FOR SIMULATING A SOFTWARE APPLICATION TO EXECUTE IN A SYSTEM

The invention relates to a method and a device for simulation of a software program to be run in a system.

The software programs run in a system (and which thus implement a method for controlling the system) frequently make use of a counter for the purpose of starting (that is to say controlling) the implementation of an action on expiration of the counter.

Especially in the aeronautical field, it furthermore is sought to test the various systems used in the same installation (such as an airplane) and their interactions, prior to their actual implementation in the installation, in particular by means of systems for simulating the actual performance of the installation.

It is understood that during the simulation it then is advisable to use systems, and software programs with which these systems are equipped, as close as possible to those that are implemented in the installation during usual functioning.

For systems in which counters are used as already indicated, however, this involves waiting for the expiration of the counter in order to be able to fully check the functioning of the system concerned, which can prove to be a very long time in certain cases, such as that of category 4 failures certain effects of which may be concealed for more than 1000 hours (up to nearly 12,000 hours in practice for certain types of failure), and which therefore consequently prolongs the duration of the test runs.

In this context, the invention proposes a method for simulation of a software program able to be run in a system and control at least one action on expiration of a counter of the system, characterized by the implementation of steps as a result of running instructions of the software program, as well as by the implementation of a step separate from the steps implemented as a result of running the software program and resulting in an early running of the said action.

In this way the simulation time may be shortened while retaining, however, the parts common to the actual functioning and to the simulation.

According to a first contemplated embodiment, the said separate step may comprise the forced writing into the counter of a value bringing about early expiration thereof. It is a matter of a practical way of bringing about early running of the action, which furthermore makes it possible to check the mechanism for starting the action on expiration of the counter when the expiration value is reached.

It may be provided that a step implemented as a result of running instructions of the software program provides for a reinitializing of the counter to a value corresponding to a time in excess of 100 hours and that the value bringing about early expiration then corresponds to a time less than one hour.

The invention is particularly advantageous in this type of context, but is not limited thereto.

The said action comprises, for example, the display of an information item on a screen of the system, as in the example presented farther on.

According to a second contemplated embodiment, possibly in combination with the first as described below, the said separate step comprises the early implementation of the said action. It is a matter of a particularly effective technique for achieving a very rapid, or even immediate, running of the action concerned.

This action comprises, for example, the transmission of an expiration information item to a module of the system, such as a maintenance module.

The invention also proposes a device for simulation of a software program able to be run in a system and to control at least one action on expiration of a counter of the system, characterized by means able to implement steps by running instructions of the software program, and means able to implement a step separate from the steps implemented as a result of running the software program and resulting in an early running of the said action.

This device possibly may have the optional characteristics indicated above regarding method.

Other characteristics and advantages of the invention will become apparent in the light of the description that follows, presented with reference to the attached drawings in which.

Figure 1:
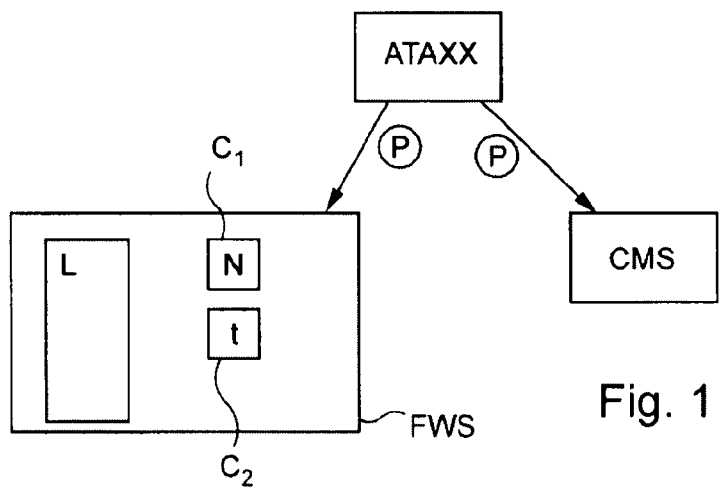
FIGS. 1 to 3 illustrate the contemplated functioning for three computers one of which controls an action on expiration of at least one counter.

The following three modules of an airplane have been shown on FIG. 1:

a computer ATAXX able to transmit, during its functioning, failure information items P, in particular category 4 failures which will be processed as described later;

a maintenance computer CMS that receives the failure information item P transmitted by computer ATAXX;

a failure computer that also receives failure information item P transmitted by computer ATAXX.

For the sake of simplification, the failure information items intended respectively for the maintenance computer and for the failure computer are designated identically. Naturally in practice it could be a matter of separate information items (which however represent the same condition of computer ATAXX).

Each computer is, for example, used by means of a processor which runs instructions of a software program loaded on the computer concerned so that the computer implements the functionalities dedicated thereto. Each computer also has memory in order to store the various information items necessary for its functioning and comprises input/output means (such as means for connection to a local network) in order to exchange information items with the other computers.

Failure computer FWS thus comprises in particular a processor intended to run a software program L stored in failure computer FWS.

Failure computer FWS furthermore comprises two counters $C_1$ and $C_2$, implemented for example in software form and used as presently described.

When failure computer FWS receives a category 4 failure information item P associated with the aforesaid counters, it reinitializes first counter $C_1$ to a first predetermined value N representative of a time ranging between 200 and 11,700 hours for category 4 failures. At this same time (that is to say on reception of information item P indicative of a category 4 failure), second counter $C_2$ is initialized to a second predetermined value t (for example representative of a time on the order of one hour).

The two counters $C_1$ and $C_2$ are decremented periodically, here every 60 ms as long as failure computer FWS continues to receive failure information item P.

Figure 2:
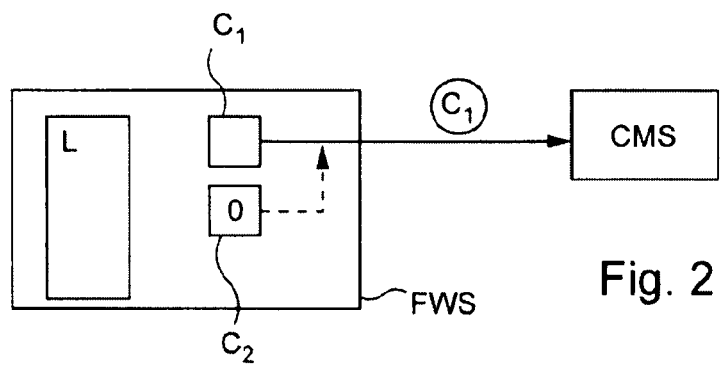

When second counter $C_2$ expires (that is to say, in the example shown on FIG. 2, when second counter $C_2$ has a zero value), failure computer FWS sends to maintenance computer CMS the real-time value of first counter $C_1$, as shown on FIG. 2.

In this way the maintenance module (associated with maintenance computer CMS) may signal to the operators in charge of maintenance on the one hand that category 4 failure P has occurred (at the moment shown on FIG. 1) and on the other hand indicate the time remaining (shown by the value of first counter $C_1$) before display of failure P on the pilot's screen as explained below.

When second counter $C_2$ has expired and started the mechanism that has just been described with reference to FIG. 2, it is reset to second predetermined value t and in this way allows periodic transmission of the value of first counter $C_1$ from failure computer FWS to maintenance computer CMS.

Figure 3:
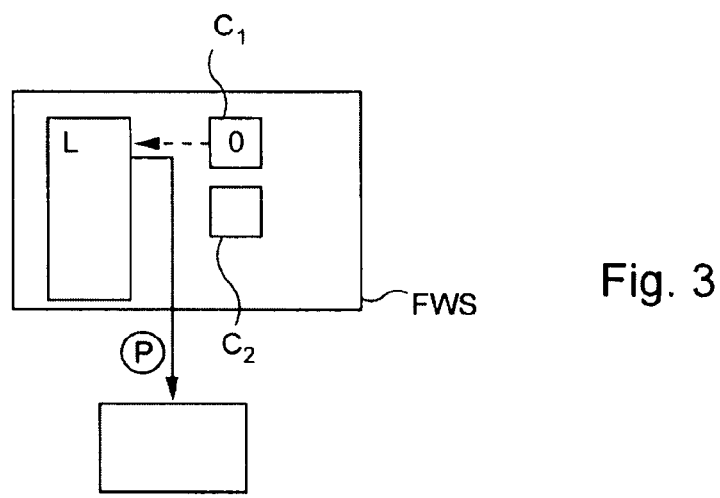
Figure 4:
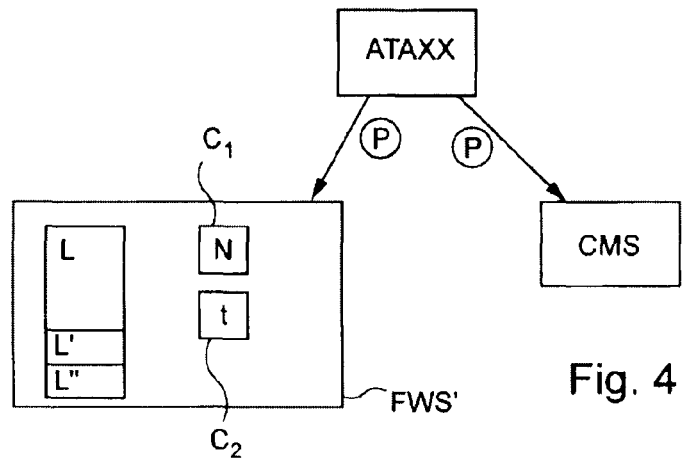
FIGS. 4 to 7 illustrate an exemplary embodiment of a simulation method in accordance with the teachings of the invention and applied to simulation of the system of FIGS. 1 to 3.
Figure 5:
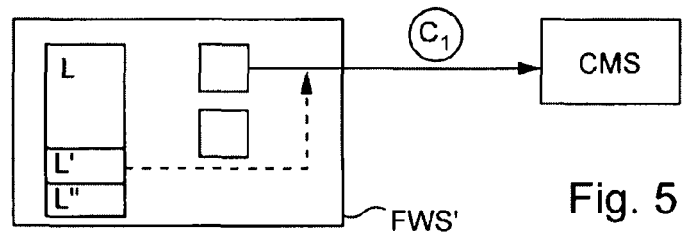
Figure 6:
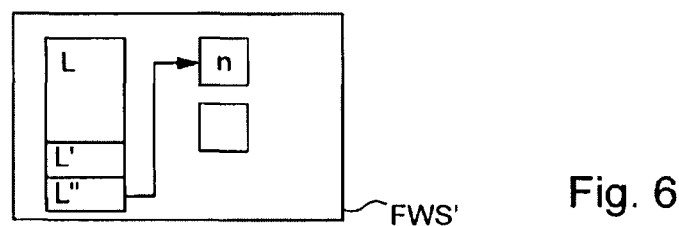

When first counter $C_1$ reaches expiration (that is to say the value zero in the example shown on FIG. 3), an interruption is generated and a branch to a predetermined place of software program L allows the latter to start the display on a screen (for example intended for the pilot of the airplane) of an information item designating failure P, as shown on FIG. 3.

It is understood that the function of first counter $C_1$ thus is to delay (as indicated above, for a period in excess of 100 hours, or even 1000 hours) the signaling of failure P to the pilot in relation to the moment when computer ATAXX transmitted this failure. The failures for which this functioning is used naturally are failures without consequence for the safety of the aircraft, and which usually are resolved by maintenance before signaling appears on the pilot's screen (the maintenance operators being informed of the failure, as seen above, at the first maintenance subsequent to the transmission of failure P by computer ATAXX).

An exemplary method for simulation of these various functionalities such as proposed by the invention has been shown on FIGS. 4 to 7.

Computer ATAXX and maintenance computer CMS are, for example, identical to those described above with a view to their simulation.

As for failure computer FWS', it is a simulation computer: it will simulate the functioning of failure computer FWS, in particular as regards computers ATAXX and CMS.

It is provided here (without its being limitative) that simulation computer FWS' is implemented on the basis of a processor different from failure computer FWS. Almost all of the source code of software program L used on failure computer FWS, however, is taken up as source code for simulation computer FWS'. As is apparent on FIG. 4, however, two portions of source code L', L" the respective functionalities of which will be described below, are added thereto. (The compilations, however, are different in the case of failure computer FWS and of simulation computer FWS' as a result of the different processors used.)

Software portion (or function) L' makes it possible to start, either automatically, or as a result of a request from a user implementing the simulation (for example through action on an interactive screen), transmission of the value of first counter $C_1$ by simulation computer FWS' to maintenance computer CMS.

This makes it possible to test the consequences of transmission of this information item to maintenance computer CMS without having to wait for expiration of second counter $C_2$ as in the case of the usual functioning shown on FIG. 2.

Figure 7:
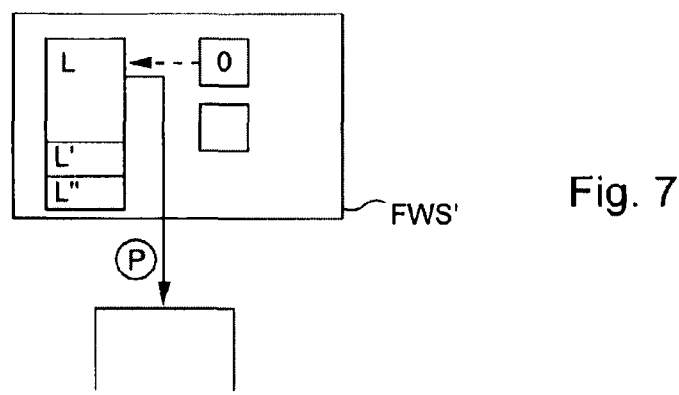

Second software portion L" makes it possible, also automatically or on command of an operator, to write into first counter $C_1$ a particularly low value n (that is to say to force first counter $C_1$ to this value n), representing a time typically less than one hour, for example one minute or less (as shown on FIG. 6), so that expiration of first counter $C_1$ (and its consequences including display of failure P on the pilot's screen as shown on FIG. 7) will take place very shortly after the implementation of this function L" by the operator of the simulation.

In this way it is possible to test, in a very short time, the start and the consequences associated with expiration of first counter $C_1$.

The above embodiments are only possible examples of implementation of the invention, which is not limited thereto.

The invention claimed is:

1. A method for simulation of a software program to be run in a system and to control at least one predetermined action, the method comprising:
    performing a plurality of steps as a result of running of instructions of the software program; and
    performing a step, separate from the steps performed as a result of running of the software program, which results in an early occurrence of said at least one predetermined action, said at least one predetermined action occurring early being transmission of a predetermined failure information item using the software program,
    wherein said performing the separate step includes forced writing into a first counter a first predetermined value, which is less than a second predetermined value causing said at least one predetermined action to occur at a normal predetermined time, to bring about early expiration of the first counter so as to cause said at least one predetermined action to occur early as compared to the normal predetermined time.

2. The method for simulation according to claim 1, wherein the running of the instructions of the software program reinitializes the first counter to the second predetermined value, which corresponds to a time in excess of 100 hours as the normal predetermined time, and
    wherein the first predetermined value which brings about the early expiration of the first counter corresponds to a time less than one hour.

3. The method for simulation according to either claim 1 or 2, wherein said at least one predetermined action occurring early, in the form of transmission of the predetermined failure information item, results in display of the predetermined failure information item on a screen of the system.

4. The method for simulation according to claim 1, wherein said plurality of steps include, upon expiration of a second counter, outputting a real-time value associated with a current value of the first counter indicative of a predetermined amount of time remaining before transmission of the predetermined failure information item, which is transmitted to a pilot's screen.

5. The method for simulation according to claim 1, wherein said plurality of steps include, responsive to the first counter expiring, generating an interrupt to cause display of the predetermined failure information item on a display.

6. The method for simulation according to claim 1, wherein the forced writing into the first counter of the first predetermined value overwrites a second value greater than the first predetermined value.

7. The method for simulation according to claim 6, wherein the second value is the second predetermined value causing said at least one predetermined action to occur at the normal predetermined time.

8. A method for simulation of a software program to be run in a system and to control at least one predetermined action, the method comprising:
    performing a plurality of steps as a result of running of instructions of the software program; and
    performing a step, separate from the steps performed as a result of running of the software program, which results in an early occurrence of said at least one predetermined action as compared to a normal predetermined time regarding occurrence of said at least one predetermined action, said at least one predetermined action occurring early being transmission of an expiration information item indicative of an amount of time remaining before transmission of a predetermined failure information item, wherein said performing the separate step includes transmitting the expiration information item from a counter.

9. The method for simulation according to claim 8, wherein said at least one predetermined action in the form of transmission of the expiration information item includes transmission of the expiration information item to a module of the system.

10. The method for simulation according to claim 8, wherein the amount of time remaining before transmission of the predetermined failure information item is a real time value of time remaining before the transmission of the predetermined failure information item.

11. The method for simulation according to claim 8, wherein the transmission of the expiration information item indicative of the amount of time remaining before transmission of the predetermined failure information item from the counter is transmitted to a maintenance computer.

12. A device for simulation of a software program to be run in a system and to control at least one predetermined action, the device comprising:

first processing circuitry configured to perform operations by running instructions of the software program; and second processing circuitry configured to perform an operation, separate from the operations performed as a result of the running of the software program, which results in an early occurrence of said at least one predetermined action as compared to a normal predetermined time regarding occurrence of said at least one predetermined action, said at least one predetermined action occurring early being transmission of an expiration information item indicative of an amount of time remaining before transmission of a predetermined failure information item, or transmission of the predetermined failure information item, wherein the transmission of the resultant early occurrence of said at least one predetermined action is to outside the device.

13. The device for simulation according to claim 12, wherein, in a case where said at least one predetermined action occurring early is the transmission of the predetermined failure information item, said separate operation includes forced writing into a counter a value bringing about early expiration thereof.

14. The device for simulation according to claim 13, wherein said at least one predetermined action occurring early results in display of the predetermined failure information item on a screen of the system.

15. The device for simulation according to claim 12, wherein, in a case where said at least one predetermined action occurring early is the transmission of the expiration information item indicative of the amount of time remaining before transmission of the predetermined failure information item, said separate operation includes transmission of the expiration information item to a module of the system.

16. The device for simulation according to claim 12, wherein said plurality of operations include, responsive to a first counter expiring, generating an interrupt to cause display of the predetermined failure information item on a display.

* * * * *